(12) United States Patent
Cowell et al.

(10) Patent No.: US 7,564,957 B1
(45) Date of Patent: Jul. 21, 2009

(54) METHOD AND SYSTEM FOR CALL CENTER SCREENING

(75) Inventors: Douglas J. Cowell, Irving, TX (US); Ravi Narayan, Honolulu, HI (US)

(73) Assignee: Verizon Corporate Services Group Inc., New York, NY (US)

( * ) Notice: Subject to any disclaimer, the term of this patent is extended or adjusted under 35 U.S.C. 154(b) by 709 days.

(21) Appl. No.: 09/692,926

(22) Filed: Oct. 20, 2000

(51) Int. Cl.
*H04M 11/00* (2006.01)

(52) U.S. Cl. .............................. 379/93.07; 379/207.02; 379/211.01

(58) Field of Classification Search .. 379/265.01–266.1
See application file for complete search history.

(56) References Cited

U.S. PATENT DOCUMENTS

| | | | | |
|---|---|---|---|---|
| 4,757,267 A | * | 7/1988 | Riskin | 379/114.24 |
| 4,839,916 A | * | 6/1989 | Fields et al. | 379/13 |
| 5,404,350 A | * | 4/1995 | DeVito et al. | 370/217 |
| 5,537,470 A | * | 7/1996 | Lee | 379/265.11 |
| 5,838,767 A | * | 11/1998 | Aoyama | 379/15.01 |
| 5,848,143 A | * | 12/1998 | Andrews et al. | 379/265.09 |
| 5,881,131 A | * | 3/1999 | Farris et al. | 379/15.03 |
| 6,044,145 A | * | 3/2000 | Kelly et al. | 379/265.02 |
| 6,405,033 B1 | * | 6/2002 | Kennedy et al. | 455/414.1 |
| 6,771,761 B1 | * | 8/2004 | LaPierre | 379/211.02 |
| 6,795,543 B1 | * | 9/2004 | Cartier et al. | 379/219 |
| 2001/0043586 A1 | * | 11/2001 | Miloslavsky | 370/352 |
| 2002/0076031 A1 | * | 6/2002 | Falcon et al. | 379/265.11 |

* cited by examiner

*Primary Examiner*—Curtis Kuntz
*Assistant Examiner*—Karen L Le (57) ABSTRACT

Methods and systems are provided for call center screening that enable a network service provider to dynamically control service request traffic directed to selected service centers. An Advanced Intelligent Network (AIN) service is configured to intercept calls originating from calling parties and directed to trigger numbers designated for processing predetermined service requests. Depending upon the trigger number, the AIN may play an announcement asking a calling party to designate the service requested. Following a calling party's valid response, a second announcement is played asking the calling party to select the type of service associated with the first response. Depending upon the calling party's responses and calling party's location, the AIN may route the call to selected service centers, in order to control the traffic to overloaded service centers.

48 Claims, 3 Drawing Sheets

ABBREVIATED MONITORING REPORT

| COLLECTED CALL STATUS INFORMATION | ADSL ONLY |
|---|---|
| | |
| NUMBER OF ADSL CALLS - RESIDENTIAL | XXXX |
| NUMBER OF ADSL CALLS - BUSINESS | XXXX |
| NUMBER OF ADSL CALLS - NO SELECTION | XXXX |
| TOTAL NUMBER OF CALLS ROUTED | XXXX |
| TOTAL NUMBER OF CALLS ABANDONED | XXXX |
| TOTAL NUMBER OF CALLS | XXXX |

FIG. 3

COMPLETE MONITORING REPORT

| COLLECTED CALL STATUS INFORMATION | ADSL / ISDN |
|---|---|
| | |
| NUMBER OF ADSL CALLS - RESIDENTIAL | XXXX |
| NUMBER OF ADSL CALLS - BUSINESS | XXXX |
| NUMBER OF ADSL CALLS - NO SELECTION | XXXX |
| NUMBER OF ISDN CALLS - RESIDENTIAL | XXXX |
| NUMBER OF ISDN CALLS - BUSINESS | XXXX |
| NUMBER OF ISDN CALLS - NO SELECTION | XXXX |
| NUMBER OF PRODUCT CALLS - RESIDENTIAL | XXXX |
| NUMBER OF PRODUCT CALLS - BUSINESS | XXXX |
| TOTAL NUMBER OF CALLS ROUTED | XXXX |
| TOTAL NUMBER OF CALLS ABANDONED | XXXX |
| TOTAL NUMBER OF CALLS | XXXX |

FIG. 4

METHOD AND SYSTEM FOR CALL CENTER SCREENING

BACKGROUND OF THE INVENTION

1. Field of the Invention

The present invention relates to telecommunication networks and, more particularly, to a method and system for intercepting calls for selected network services and routing the calls to predetermined call centers.

2. Background of the Art

In present network service environments, customers may order Asynchronous Digital Subscriber Line (ADSL) and Integrated Services Digital Network (ISDN) service simply by calling designated telephone numbers associated with a service provider, and requesting the desired service. Generally, separate telephone numbers were designated for specific types of customers requesting ADSL service. Residential ADSL service was associated with one telephone number, while business ADSL service was associated with another number.

As the popularity and demand for ADSL service increased, the business number associated with ADSL service became widely distributed. Eventually, customers requesting residential ADSL service were calling the business ADSL numbers more frequently than the residential ADSL telephone number. As a result, the Business Service Centers (BSCs) handling these service requests were receiving excess traffic, which affected the processing speed of the requests. At the same time while the BSCs were overloaded, residential sales centers associated with handling residential ADSL service calls were being underutilized.

Although conventional techniques for handling service requests enable customers to differentiate between the types of service they would like to receive, the methods in which the service requests are handled have drastic affects on the systems implementing these methods. The mis-management of service requests affect not only the traffic load of specific areas of the provider's network, but have business repercussions as well. Delays in service request processing have a tendency to frustrate potential customers because of the extended time taken to process service requests routed to overloaded service centers. Frustrated customers have tendencies to look for services elsewhere when the process for obtaining an available service from a provider is deemed tedious or lengthy.

SUMMARY OF THE INVENTION

It is therefore desirable to have a method and system that will alleviate excess traffic to selected sales centers at the same time reducing the processing time customers have to wait for service request responses.

Methods, systems and articles of manufacture consistent with the present invention utilize different telephone numbers for ordering different services. A first telephone number is associated only with one available service and is advertised to the public in a specific forum, while a second telephone number is associated with the one available service, as well as another service. The telephone number associated with both services is advertised in a general forum. An Advanced Intelligent Network (AIN) service intercepts the service request calls associated with both telephone numbers and routes residential and business customers to specific call centers.

In accordance with an embodiment of the invention, when a customer dials one of the designated service telephone numbers, the AIN intercepts the call and analyzes the called telephone number to determine which service(s) is/are associated with the number. Depending upon the telephone number called, the AIN may query the customer if they are calling for a first or second type of service. Subsequently, the customer is then queried if they are requesting residential or business service. The call is then routed to the appropriate service center for processing. In one embodiment of the invention, when the services are associated with ADSL and ISDN services, a New Initiative and Product Center (NIAPC) processes all ADSL residential service requests while regional BSCs process all others types of requests, based upon the location of the customer who initiated the service request.

In accordance with another embodiment of the invention, status information regarding the types of requests for each telephone number are collected and sent to a customer. The customer determines how they want calls to be routed. The destinations determined by the customer are built into a database which is used to route the calls to a selected service center.

In accordance with another embodiment of the invention, test calls are periodically generated to determine the dependability of the network routing operations associated with the AIN interception service. These test calls are not routed directly to a service center, and are not included in status information sent to the customer Accordingly, a service provider network may dynamically control the traffic to selected service centers, based upon the type of service requested, and the location of the caller requesting the service.

BRIEF DESCRIPTION OF THE DRAWINGS

The foregoing summary and the following detailed description should not restrict the scope of the claimed invention. Both provide examples and explanations to enable others to practice the invention. The accompanying drawings, which form part of the description of the invention, show several embodiments of the invention, and together with the description, explain the principles of the invention.

In the Figures.

DETAILED DESCRIPTION

The following description of embodiments of this invention refers to the accompanying drawings. Where appropriate, the same reference numbers in different drawings refer to the same or similar elements.

In accordance with an embodiment of the invention, an Advanced Intelligent Network (AIN) service is configured to intercept calls originating from calling parties and directed to particular telephone numbers designated for processing service requests. Depending upon the trigger number, the AIN may instruct a Service Switching Point (SSP) to play an announcement asking a calling party to designate the service requested. If no response is receive, or an invalid response is returned, the response is labeled as an invalid entry and is associated with a default service request for processing. Following a calling party's response (or invalid response), a second announcement is played asking the calling party to designate additional information associated with the type of service designated with the first response. Again, if no response is received, or an invalid response is returned, the response is labeled as an invalid entry and is associated with a default service request for processing. Depending upon the calling party's responses and calling party's location, the AIN may route the call to selected service centers, in order to control the traffic to overloaded service centers.

Figure 1:
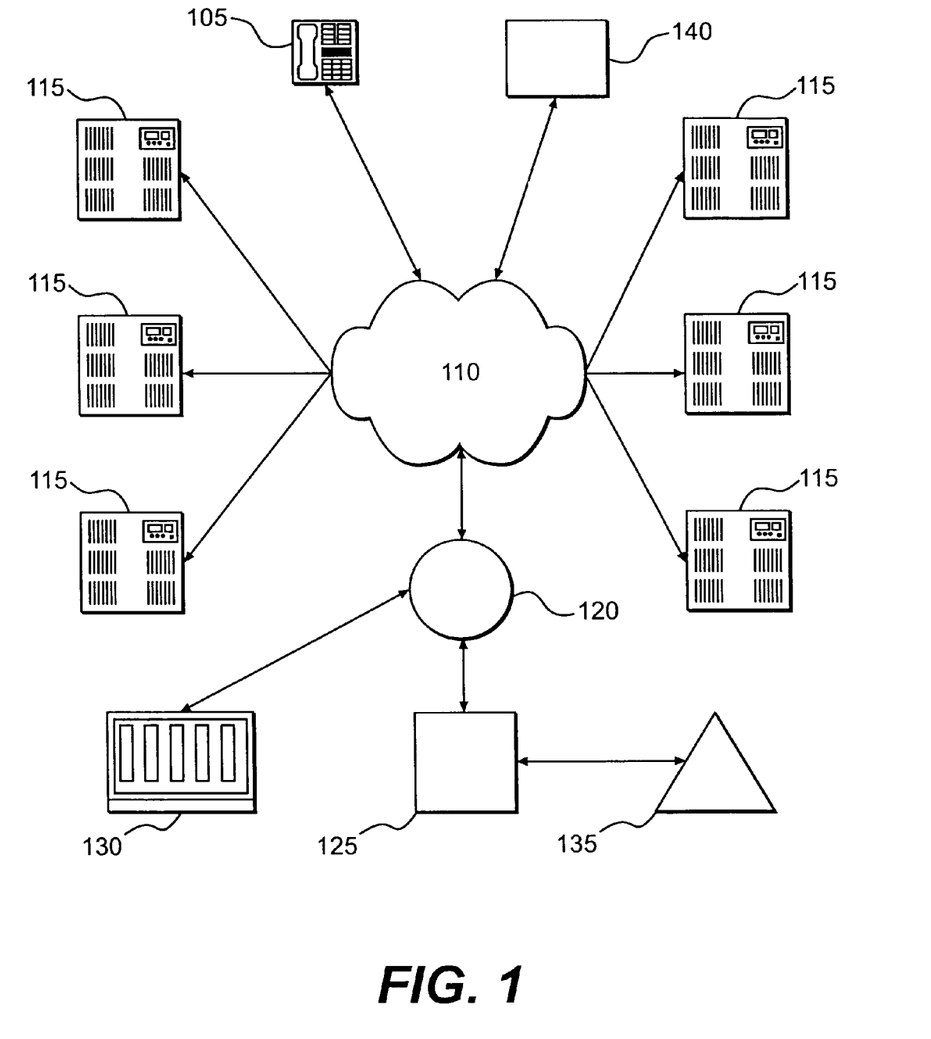
FIG. 1 is a block diagram of a telecommunications network, in accordance with methods and systems consistent with the invention.

FIG. 1 shows a block diagram of a telecommunications network that processes calls for services provided by the network, in accordance with systems and methods consistent with the invention. For illustration purposes, the services governed by a provider of the network will be described as Asynchronous Digital Subscriber Line (ADSL) and Integrated Services Digital Network (ISDN) services, however it should be noted that the present invention can be applied to a variety of services, and are not limited to the exemplary services described herein.

As shown, FIG. 1 comprises a wireline device 105, Public Switch Telephone Network (PSTN) 110, Business Service Centers (BSCs) 115, Service Switching Point (SSP) 120, Service Transfer Point (STP) 125, New Initiative And Product Center (NIAPC) 130, Service Control Point (SCP) 135 and test call generator 140.

SSP 120 may include, for example, a 5ESS™, DMS-100™ (or DMS-200™), GTD-5™. As explained below in detail, SSP 120 is configured to receive and route call requests from PSTN 110 originating from wireline device 105.

Service control point 135 may include, for example, a AI-NET™, Integrated Service Control Point (ISCP™), or Service Builderm equipment/software manufactured or provided by Lucent Technologies, Inc., Telcordia Technologies, Inc., and Nortel Networks Corporation, respectively. SCP 135 instructs SSP 120 on what announcements to play, and where to route calls.

BSCs 115 are service centers each respectively located in particular regions, and process calls from all business customers and calls for ISDN service. Although only six BSCs are shown in FIG. 1, it is understood that a plurality of BSCs exceeding six may be utilized in the network.

NIAPC 130 is a service center that processes calls for residential ADSL service.

Test call generator 140 is an automated testing tool that generates test calls to verify SCP135's ability to invoke a service logic program in response to service calls being received at SSP 120.

Figure 2:
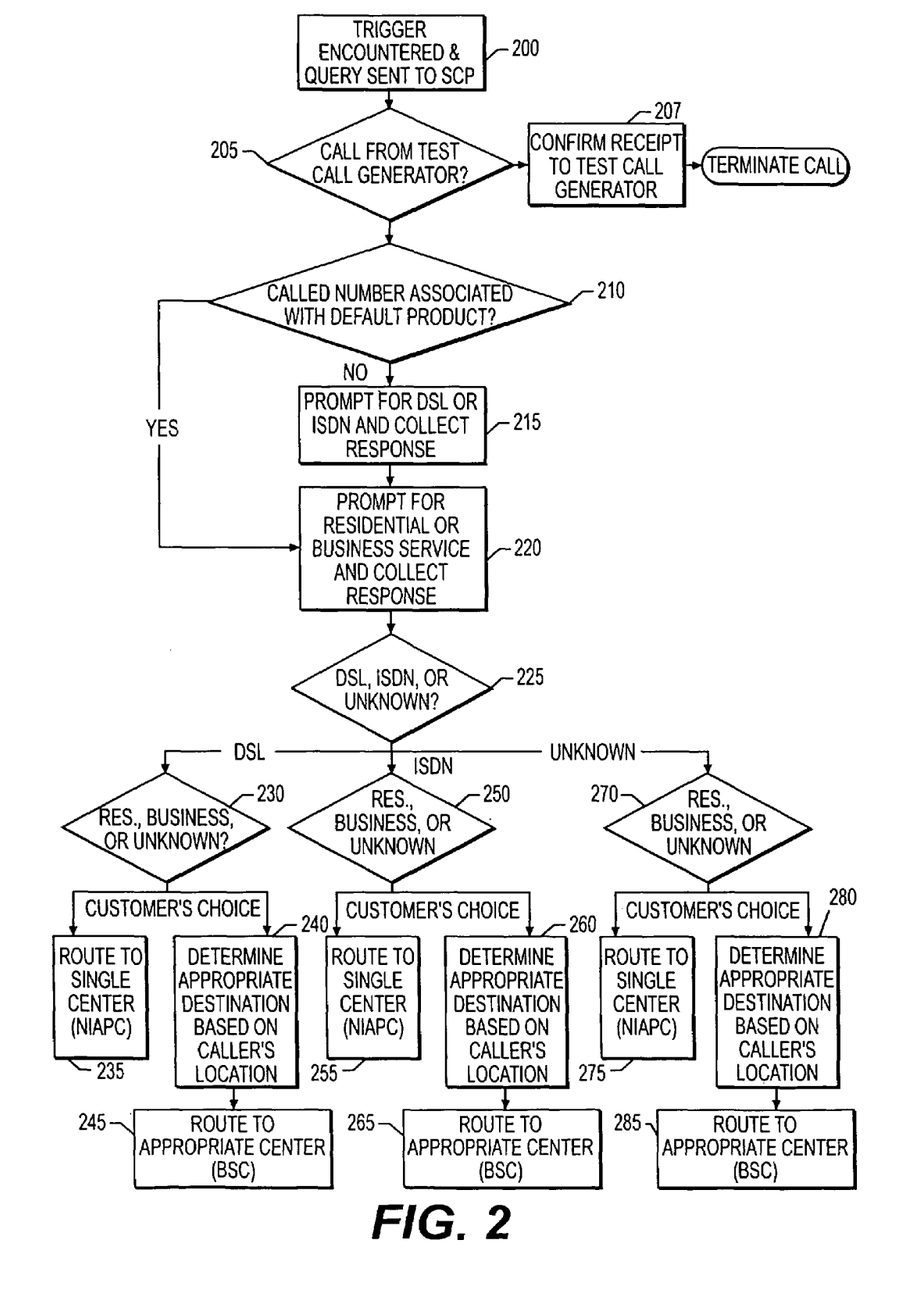
FIG. 2 is a flow chart of the steps performed for processing service calls, in accordance with methods and systems consistent with the invention.

FIG. 2 is a flow chart of the steps performed by the network illustrated in FIG. 1, when processing service requests for ADSL and ISDN services. Processing begins when a service customer, or calling party, calls one of two telephone numbers designated for ordering a particular service such as ISDN or ADSL. The call is received through PSTN 110, and automatically directed to a designated switching point dedicated to handling these types of service requests. Once the trigger number is encountered, SSP 120 launches a query message to SCP 135 (Step 200). The query message contains the CallingPartyId or ChargeNumber, and is routed to SCP 135 through STP 125. Once received, a Service Logic Program (SLP) is executed by SCP 135 that analyzes the query message and trigger numbers to determine what type of announcement is to be played.

Before call screening operations commence, SCP 135 determines whether the incoming call is from test call generator node 140 (Step 205). Test call generator 140 is an automated testing tool that injects test calls into the network, and monitors whether the test call is routed properly from the calling party to SCP 135. Test call generator ensures the test calls that include trigger numbers identical to those associated with the services provided by the network, are received at SSP 120, and eventually invoke the SLP on SCP 135. If a test call was encountered, its receipt is confirmed with test call generator 140 (Step 207), and subsequently the call is terminated.

In the event the incoming call was not a test call, SCP 135 analyzes the trigger number to determine what type of query processing is needed for the customer. This analysis is performed in order to reduce possible processing operations performed by the SLP, thus reducing the load on the network. In one embodiment of the invention, each type of service offered is advertised in different forums. For example, the telephone number associated with ADSL service may be provided only to Internet Service Providers (ISPs) for advertising. ISDN services are advertised in any remaining forums, excluding the ISP forum. Other forums associated with a default product, such as ADSL service, may be implemented as well. Accordingly, when the SLP analyzes the trigger number and query message, it checks to determine whether the trigger number is associated with the number only advertised by the ISPs (Step 210). Calls made to the telephone number advertised by the ISPs are already known to be ADSL inquires. Rather than confuse potential customers with an ISDN option, these calls are processed by forwarding SLP operations to query the calling party for types of ADSL service desired (Step 220), as will be described later.

The SLP supports Numbering Plan Area (NPA) splits of the trigger number. Although it is not the responsibility of the SLP to convert and store any calling party data from an old NPA to a new NPA, both of the old and new numbers are accepted by the SLP and processed in the same manner. SCP 135 maintains an NPA split table that enables all NPA splits occurring in the North American Number Plan area to be tracked. The table is periodically updated to ensure that calls originating from these split areas are capable of being handled by the SLP.

Returning back to step 210, if the SLP determines that the trigger number is not associated with ISP advertising, the SLP sends instructions to SSP 120 to play an announcement requesting the calling party to choose the service desired, ISDN or ADSL (Step 215). There may be instances where calling parties intending to order ADSL service, utilizes the ISDN dedicated telephone number. To ensure this situation may be handled by the call screening operations of the present invention, the SLP provides the option of ADSL service in the announcement. In one embodiment of the invention, the announcement queries the calling party to select a specific digit on wireline device 105 to indicate the service desired. For example, the announcement may be, but is not limited to:

"If you are calling for DSL service, press one. If you are calling for ISDN service, press two".

In the event the calling party chooses an invalid entry, or fails to respond, the SLP labels the response as an unknown response and forwards processing to step 220.

At step 220, SCP 135 sends instructions to SSP 120 to play an announcement that queries the calling party for a choice of business or residential service, and collects the response to the query. In one embodiment of the invention, the announcement queries the calling party to select a specific digit on wireline device 105, to indicate the type of service desired. For example, the announcement may be, but is not limited to: "If this service is for your home, press one. If this service is for your business, press two".

In the event the calling party chooses an invalid entry, or fails to respond, the SLP labels the response as an unknown response.

The present invention enables customers, whom are entities that own the call centers and utilize the call center screening service provided by the network, to designate the routing parameters for service request calls. These customers may include a Call Center Management (CCM) (not shown), and selectively choose how the calls are to be routed. The customer specified routing destinations are collected by the network, and stored in a database. Table 1 illustrates exemplary routing options available to these customers. Depending upon the response from the calling party (Step 225), and the routing destinations set up by a customer, the SLP will direct the call to a particular designated service center.

As shown in Table 1, ADSL business requests are routed to be processed by an appropriate BSC 115. When SLP determines that a business DSL service request is received (Step 230), the SLP determines how to route the service request call based upon the location of the calling party (Step 240). The Calling Party Number (CPN) or Charge Number (CN) associated with the calling party initiating the service request is compared to a table that contains a national listing of Numbering Plan Areas (NPAs) to locate the originating state. That is, the SLP determines from what state the calling party initiated the call. If no match is found, a default value is used, which may be associated with the NIAPC. The SLP uses the results from the comparison to locate a regional BSC that has been previously designated to handle calls originating from a particular state and the call is routed to the appropriate BSC 115, as shown in step 245.

The routing of the calls to the correct BSC 115 is controlled in part by the SLP. The SLP sends routing instructions to SSP 125 using telephone numbers with a predetermined code value as the carrier. In one embodiment of the invention, the telephone number will be a ten digit number with a four digit carrier code. It should be noted that a plurality of variations may be used for routing the call to a particular BSC, including varying the number of digits used as the routing numbers.

BSCs 115 may be assigned regionally depending upon the capabilities of the network providing the services. In one example, each state is assigned a destination telephone number, and BSCs associated with the state and the destination telephone number receive calls originating from that state.

When SLP determines that a residential or unknown ADSL service request has been received (Step 230), the call is routed to a single designated service center (Step 235). In the exemplary routing parameters illustrated in Table 1, all residential and unknown ADSL service requests are processed by a designated NIAPC, thus reducing the workload on the BSCs 115. Accordingly, in step 235, the SLP returns instructions to SSP 120 on how to route the call, and SSP 120 performs the routing operations necessary to send the call to a gate at NIAPC 130. NIAPC 130 receives the call and processes the service request. It is apparent that some calling parties that eventually get routed to NIAPC 130 may actually wish to order ISDN or ADSL business services. At this stage, NIAPC 130 will have the capability for routing the call to an appropriate BSC 115, by sending the appropriate routing information to SSP 120, or for processing the service request at the NIAPC 130. The routing operations depend upon a plurality of factors such as, for example, the traffic load at NIAPC 130.

Calls that are routed to NIAPC 130 are terminated over a provisioned route index and sent with a Dialed Number Identification Service (DNIS) code. A percentage of calls may also be sent to a provisioned telephone number instead of the trunk group.

When SLP determines that an ISDN service request has been received (Step 225), it performs further analysis to determine the type of ISDN service requested by the calling party (Step 250). The exemplary routing parameters shown in FIG. 1 indicate that all types of ISDN service are to be handled by an appropriate BSC (Step 260). As performed for business DSL services, the SLP determines how to route the ISDN service request call based upon the location of the calling party (Step 260). The Calling Party Number (CPN) or Charge Number (CN) associated with the calling party initiating the service request is compared to a table that contains a national listing of Numbering Plan Areas (NPAs) to locate the originating state. That is, the SLP determines from what state the calling party initiated the call. If no match is found, a default value is used, which may be associated with the NIAPC. The SLP uses the results from the comparison to locate a regional BSC that has been previously designated to handle calls originating from a particular state and the call is routed to the appropriate BSC 115, as shown in step 265.

As indicated previously, customers may adjust the routing parameters as they see fit. That is, a customer may decide to route certain types of ISDN service requests to NIAPC 130. In this case, SLP would return instructions to SSP 120 on how to route the call, and SSP 120 performs the routing operations necessary to send the call to a gate at NIAPC 130, (Step 255). NIAPC 130 receives the call and processes the service request, as described with reference to step 235.

When SLP determines that the service request is unknown (Step 225), the SLP determines whether residential, business or an invalid response was received (Step 270). The SLP determines where to route the call based on the routing parameters set up by the customer, and the result from step 270. The exemplary routing parameters shown in Table 1 show that unknown residential and complete unknown service requests are defaulted to NIAPC 130 (Step 275). Thus, when such service calls are received at SSP 130, and forwarded to SCP 135, the SLP routes calls to NIAPC 130 as previously described with reference to steps 235 and 255. Unknown business calls are routed to an appropriate BSC (Steps 280, 285) based on the caller's location, as previously described with reference to steps 240, 245.

As with any of the services, customers may designate selected service centers to handle selected types of unknown service calls. For example, a customer, such as a CCM node may want all unknown service calls to be handled by NIAPC 130. In this case, the database reflecting the routing parameters shown in Table 1, would be changed to indicate the designated destinations.

TABLE 1

Call Routing by Caller Selections

Caller Selections

| Product | Usage | Route by NIAPC | Route by caller's state |
|---------|-------------|----------------|-------------------------|
| ADSL | Residential | X | |
| ADSL | Business | | X |
| ADSL | Unknown | X | |
| ISDN | Residential | | X |
| ISDN | Business | | X |
| ISDN | Unknown | | X |

TABLE 1-continued

Call Routing by Caller Selections

| Caller Selections | | | |
|---|---|---|---|
| Product | Usage | Route by NIAPC | Route by caller's state |
| Unknown | Residential | X | |
| Unknown | Business | | X |
| Unknown | Unknown | X | |

As can be seen, depending upon the selection of the caller, specific service centers will be selected as the destination for call routing operations. In addition, each target telephone number associated with the routing options listed above may have a designated secondary routing number, or route index with Dialed Number Identification Service (DNIS) code. Calls may be sent to the primary or secondary number based on percentage distribution routing or transmission problems that may occur during operations. For instance, a BSC in a particular state may have a history of experiencing a large amount of traffic in relation to other service centers. Accordingly, calls designated for routing the overloaded BSC may be rerouted to a predetermined auxiliary service center. Furthermore, the auxiliary service center may be selected dynamically, based upon the current workload of a BSC, or the NIAPC 130 as well. This process institutes versatility in routing service calls to an appropriate service center based on factors that affect performance of the network, including errors and/or faults.

In the event an error occurs during AIN processing, the call will be returned to SSP 120 for routing as dialed. In one embodiment of the invention, SSP 120 ensures that calls that cannot be processed are delivered to a designated default location, such as NIAPC 130. It should be noted that a variety of service centers may be selected as backups for error processing, including multiple combinations of service centers, based upon the service relationship between SSP 120 and the service centers, as well as the type of failure encountered. For example, in the event of an AIN failure, SSP 120 would only be able to route calls to the service center it is serving. That is, if NIAPC 130 is served by SSP 120, while BSC s 115 were not, SSP 120 would only be able to route a call to NIAPC 130 because it would not have the capability to route the call beyond its locally served center.

In order to designate the proper auxiliary service centers, as well as monitor the progress of the AIN call center screening operations, status information is collected for each call that is processed. Traffic information is collected by monitoring predetermined operations associated with the call center screening process. For example, for each triggering number, a number of values are recorded by SCP 135, and stored in a database (not shown). The database may be used to send messages, such as electronic mail, to the customer for future analysis.

Figure 3:
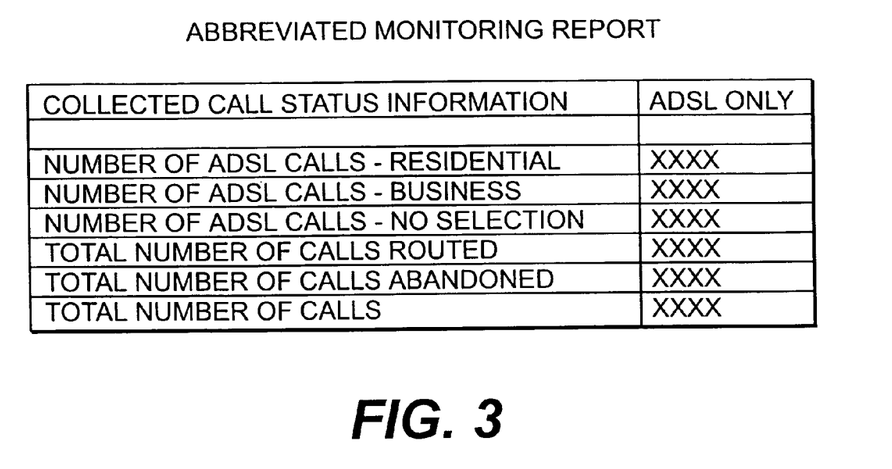
FIG. 3 is a table showing an exemplary abbreviated monitoring report including limited service call status information, in accordance with methods and systems consistent with the invention.
Figure 4:
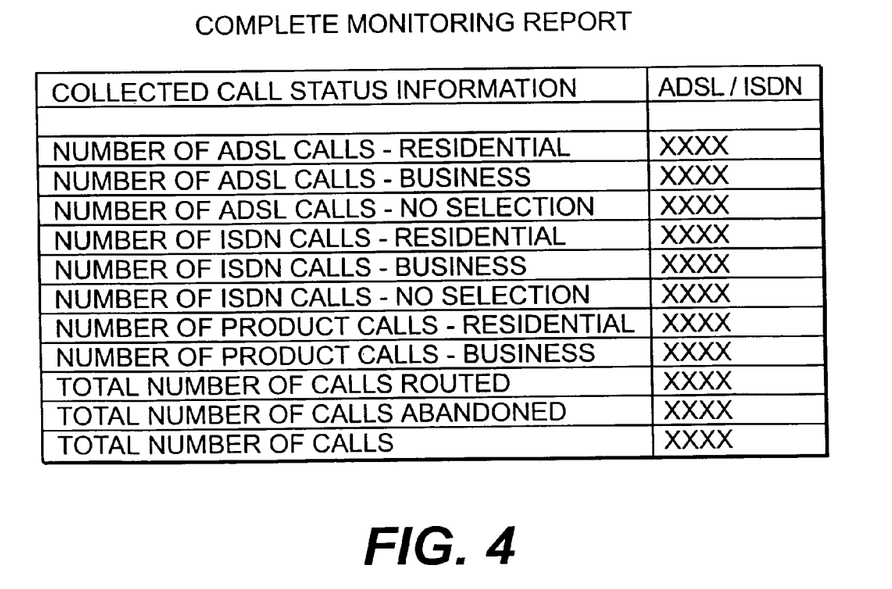
FIG. 4 is a table showing an exemplary complete monitoring report including detailed service call status information, in accordance with methods and systems consistent with the invention.

FIGS. 3 and 4 illustrate reports that are generated by the AIN processing network and distributed to the service centers and the CCM, for evaluation of traffic and service center screening operations. FIG. 3 shows an abbreviated monitoring report that includes a number of values measured during a preselected period of time. The time period for monitoring is flexible, and may be adjusted dynamically. For example, the values may be collected daily, weekly or monthly. FIG. 4 shows a more detailed report that includes additional values collected that are not included in the abbreviated report illustrated in FIG. 3. The customer analyzes the aggregated status information found in the reports. The information collected in the reports may be utilized to adjust the designations of primary or auxiliary service centers, as well as provide an indication of how well the call screening process is performing, so changes in hardware or call processing software may be implemented. For example, referring to the routing parameters shown in Table 1, suppose a BSC located in the state of Pennsylvania was overloaded with business ADSL service calls from that state, while NIAPC 130 was receiving low levels of traffic. A customer may recognize the need to perform traffic balancing based on received status reports, and thus decide to change the destination of calls from this state to the NIAPC 130. In this case, the database storing the destinations for the service calls would be changed to reflect the new destination. Referring to Table 1, this would change the routing parameters to reflect that all ADSL service requests are to be sent to NIAPC 130. Subsequently, on the next report, the customer may decide that NIAPC 130 was being overloaded, and another change in routing parameters would be instituted. Accordingly, the present invention allows the call center screening procedures to be performed dynamically and selectively.

As described, systems, methods and articles of manufacture, consistent with the present invention, allow overloaded service centers to be relieved of excess traffic by screening incoming service request calls, and automatically routing the calls to predetermined destination nodes, based on the trigger number of the call.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, although ADSL and ISDN services were utilized to describe the operations of the present invention, a number of different types of services may be implemented without affecting the AIN call center screening operations described above. That is, the type of service being provided by the network are not limited to the examples described above. Additional modifications and variations of the invention may be, for example, the described implementation includes software but the present invention may be implemented as a combination of hardware and software or in hardware alone.

The invention may be implemented with both object-oriented and non-object-oriented programming systems.

What is claimed is:

1. A method for routing a call dialed using one of a plurality of numbers, the plurality of numbers comprising a first number associated with a first service, and a second number associated with the first service and a second service, the method comprising the steps of:

receiving data from a customer designating routing destinations for calls and storing the designated routing destinations in a database;

receiving a call dialed using one of the plurality of numbers from a calling party, wherein the call includes a trigger number;

determining whether the trigger number is associated with the first or second number;

based on the determination that the trigger number is associated with the second number, requesting the calling party to select the first or second service;

based on the determination that the trigger number is associated with the first number, requesting the calling party to select one of a plurality of related types of the first service; and routing the call to one of a plurality of service centers, based upon a response from the calling party to the request and the designated routing destinations indicated by the customer data.

2. The method of claim 1, wherein the step of requesting the calling party to select the first or second service further includes:
   requesting the calling party to select a type of the first service in response to the calling party selecting the first service; and
   requesting the calling party to select a type of the second service in response to the calling party selecting the second service.

3. The method of claim 2, wherein the routing step further includes:
   routing the call to a first service center in response to the calling party selecting a first type of the first service; and
   routing the call to a second service center in response to the calling party selecting one of a second type of the first service, a first type of the second service and a second type of the second service.

4. The method of claim 3, wherein routing the call to a second service center further includes:
   locating the second service center based upon a calling party number associated with the calling party.

5. The method of claim 3, wherein routing the call to a second service center further includes:
   locating the second service center based upon a state from which the calling party initiates the call.

6. The method of claim 5, wherein the calling party is associated with a calling party number, and wherein locating the second service center further includes:
   comparing the calling party number with a number plan area table to determine the state from which the calling party initiates the call.

7. The method of claim 3, wherein when the first service center is associated with a first auxiliary service center, the method further including the steps of:
   detecting a network fault condition associated with routing the call to the first service center; and
   rerouting the call to the first auxiliary service center.

8. The method of claim 7, wherein the first auxiliary service center is the second service center.

9. The method of claim 7, wherein when the second service center is associated with a second auxiliary second service center, the method further including the steps of:
   detecting a network fault condition associated with routing the call to the second service center; and
   rerouting the call to the second auxiliary service center.

10. The method of claim 9, wherein the second auxiliary service center is the first service center.

11. The method of claim 7, wherein the first service center is associated with a different auxiliary service center, after the customer analyzes a report including data regarding traffic or screening procedures associated with the plurality of service centers.

12. The method of claim 3, wherein when the first service center is associated with a first auxiliary service center, the method further including the steps of:
   detecting a traffic overload condition associated with routing the call to the first service center; and
   rerouting the call to the first auxiliary service center.

13. The method of claim 2, wherein the first service is ADSL service and the second service is ISDN service and wherein the type of the first service is one of residential and business ADSL service, and the type of the second service is one of residential and business ISDN service.

14. The method of claim 1, further including:
   collecting status information associated with the call; and
   storing said status information in a status log.

15. The method of claim 14, wherein the status information includes information associated with the service selected by the calling party, the type of service selected by the calling party, the service center to which the call was routed and abandoned calls.

16. The method of claim 14, further including:
   utilizing the collected status information to determine where subsequent calls are to be routed.

17. The method of claim 1, wherein the customer designates routing destinations for service calls based on the customer's analysis of a report including data regarding traffic or screening procedures associated with the plurality of service centers.

18. The method of claim 1, wherein the designated routing destinations are non-predetermined.

19. The method of claim 1, wherein the calling party and the customer are different entities.

20. A system for routing a call dialed using one of a plurality of numbers, the plurality of numbers comprising a first number associated with a first service, and a second number associated with the first service and a second service, the system comprising:
   a calling party node configured to connect a calling party to a network;
   a switching node connected to the network for receiving a call dialed using one of a plurality of numbers, the call including a trigger number, from the calling party node through the network;
   a switching control node connected to the switching node for receiving data from a customer designating routing destinations for calls, storing the designated routing destinations in a database, and determining a service center to which the call is to be routed, based on the trigger number, service query responses from the calling party, and the designated routing destinations indicated by the customer data,
   wherein based on the determination that the trigger number is associated with the first number, said switching control node forwards requests to the calling party to select one of a plurality of related types of the first service, and the calling party generates said service query responses in response to said requests,
   a first service center connected to the switching node for processing call requests for the first service; and
   a plurality of second service centers connected to the network for processing call requests for the second service.

21. The system of claim 20, wherein the switching control node, based on the determination that the trigger number is associated with the second number, forwards requests to the calling party to select the first or second service, and wherein the service query responses are received in response to the requests.

22. The system of claim 21, wherein the switching control node instructs the switching node to request the calling party node to select a type of the first service in response to the calling party node selecting the first service and request the calling party node to select a type of the second service in response to the calling party node selecting the second service.

23. The system of claim 22, wherein the switching control node instructs the switching node to route the call to the first service center in response to the calling party node selecting a first type of the first service.

24. The system of claim 23, further including:
a first auxiliary service center for receiving the call routed to the first service center when the switching control node detects a network fault in routing the call to the first service center.

25. The system of claim 22, wherein the switching control node instructs the switching node to route the call to one of the plurality of second service centers in response to the calling party node selecting one of a second type of the first service, a first type of the second service and a second type of the second service.

26. The system of claim 25, wherein the switching control node includes a memory device that contains a number plan area table and wherein the switching control node determines the one of the plurality of second service centers by comparing a calling party number associated with the calling party node, with information contained in the number plan area table.

27. The system of claim 26, wherein the switching control node determines a state from which the calling party node is located based upon the comparing of the calling party number with the information contained in the number plan area table.

28. The system of claim 25, further including:
a second auxiliary service center for receiving the call routed to the one of the plurality of second service centers when the switching control node detects a network fault in routing the call to the one of the plurality of second service centers.

29. The system of claim 22, wherein the type of the first service is one of residential and business ADSL service and wherein the type of the second service is one of residential and business ISDN service.

30. The system of claim 21, wherein the first service is ADSL service and the second service is ISDN service.

31. The system of claim 20, further including:
a test call generator connected to the network for generating test calls including a test trigger number directed to the switching node, wherein the test call generator verifies whether the switching control node receives the test call.

32. The system of claim 20, wherein the switching control node includes a service logic program, the system further comprising:
a test call generator connected to the network for generating test calls to verify that the switching control node activates the service logic program in response to the switching node receiving the test calls, wherein the service logic program performs the functions of determining a service center to which the call is to be routed based on the trigger number and service query responses from the calling party.

33. The system of claim 20, wherein the customer designates routing destinations for service calls based on the customer's analysis of a report including data regarding traffic or screening procedures associated with the plurality of service centers.

34. A computer program storage device having a computer program being operable to cause a processor to perform a method for routing a call dialed using one of a plurality of numbers, the plurality of numbers comprising a first number associated with a first service, and a second number associated with the first service and a second service, the method comprising the steps of:
receiving a call dialed using one of the plurality of numbers from a calling party, wherein the call includes a trigger number;
receiving data from a customer designating routing destinations for calls and storing the designated routing destinations in a database;
determining whether the trigger number is associated with the first or second number;
based on the determination that the trigger number is associated with the second number, requesting the calling party to select a first or second service;
based on the determination that the trigger number is associated with the first number, requesting the calling party to select one of a plurality of related types of the first service; and
routing the call to one of a plurality of service centers, based upon a response from the calling party to the request and the designating routing destinations indicated by the customer data.

35. The computer program storage device of claim 34, wherein the step of requesting the calling party to select the first or second service, further includes:
requesting the calling party to select a type of the first service in response to the calling party selecting the first service; and
requesting the calling party to select a type of the second service in response to the calling party selecting the second service.

36. The computer program storage device of claim 35, wherein the routing step further includes:
routing the call to a first service center in response to the calling party selecting a first type of the first service; and
routing the call to a second service center in response to the calling party selecting one of a second type of the first service, a first type of the second service and a second type of the second service.

37. The computer program storage device of claim 36, wherein routing the call to a second service center further includes:
locating the second service center based upon a calling party number associated with the calling party.

38. The computer program storage device of claim 36, wherein routing the call to a second service center further includes:
locating the second service center based upon a state from which the calling party initiates the call.

39. The computer program storage device of claim 38, wherein the calling party is associated with a calling party number, and wherein locating the second service center further includes:
comparing the calling party number with a number plan area table to determine the state from which the calling party initiates the call.

40. The computer program storage device of claim 35, wherein the first service is ADSL service and the second service is ISDN service and wherein the type of the first service is one of residential and business ADSL service, and the type of the second service is one of residential and business ISDN service.

41. The computer program storage device of claim 34, wherein the customer designates routing destinations for service calls based on the customer's analysis of a report including data regarding traffic or screening procedures associated with the plurality of service centers.

42. The computer program storage device of claim 34, wherein the method further includes the steps of:
collecting status information associated with the call; and
storing said status information in a status log.

43. The computer program storage device of claim 42, wherein the status information includes information associated with the service selected by the calling party, the type of service selected by the calling party, the service center to which the call was routed and abandoned calls.

44. The computer program storage device of claim 42, wherein the method further includes the steps of:
    utilizing the collected status information to determine where the service center subsequent calls are to be routed.

45. The computer program storage device of claim 36, wherein the first service center is associated with a first auxiliary service center, the method further including the steps of:
    detecting a network fault condition associated with routing the call to the first service center; and
    rerouting the call to the first auxiliary service center.

46. The computer program storage device of claim 45, wherein the first auxiliary service center is the second service center.

47. The computer program storage device of claim 45, wherein the second service center is associated with a second auxiliary second service center, the method further includes the steps of:
    detecting a network fault condition associated with routing the call to the second service center; and
    rerouting the call to the second auxiliary service center.

48. The computer program storage device of claim 47, wherein the second auxiliary service center is the first service center.

\* \* \* \* \*